United States Patent Office 3,353,492
Patented Nov. 21, 1967

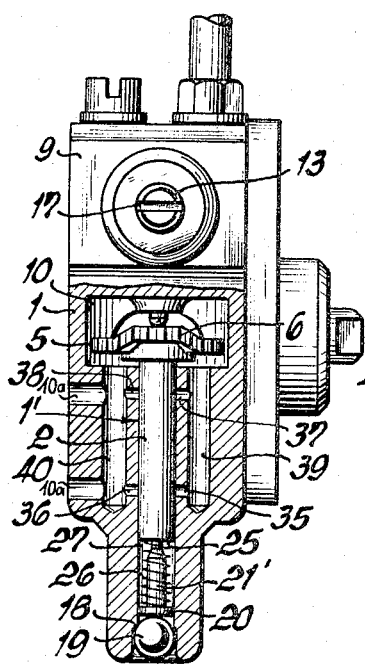
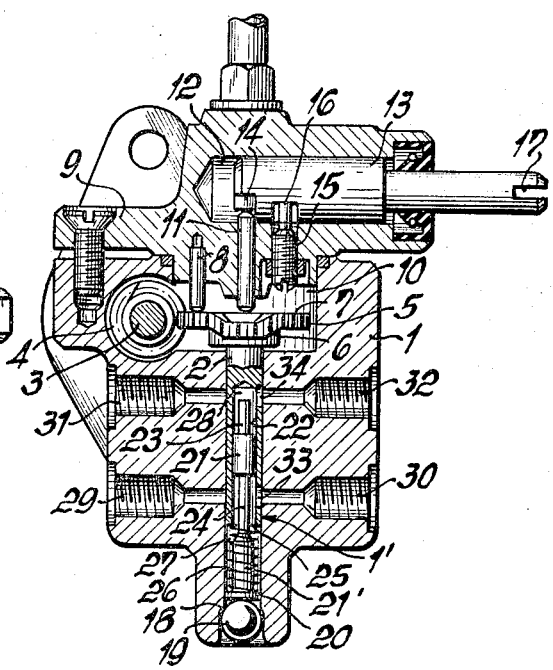
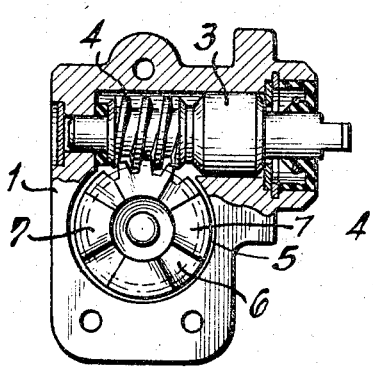
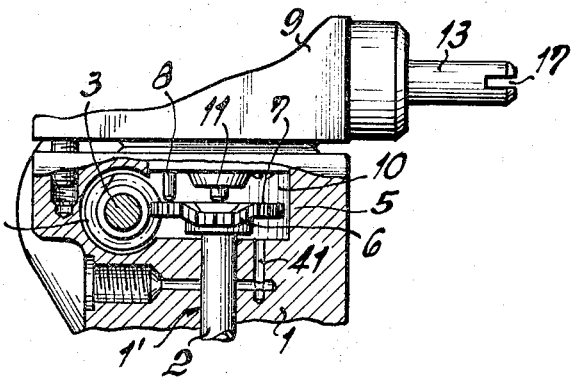
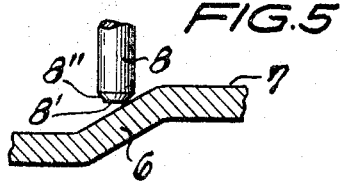

3,353,492
LUBRICATING PUMP
Josef Heinzelmann, Ablach, near Sigmaringen, and Fritz Hugendubel, Stuttgart-Feuerbach, Germany, assignors to Robert Bosch GmbH, Stuttgart, Germany
Filed Jan. 25, 1966, Ser. No. 522,975
Claims priority, application Germany, Jan. 26, 1965, B 80,265
9 Claims. (Cl. 103—157)

ABSTRACT OF THE DISCLOSURE

A lubricating pump in which a piston formed with a blind bore is rotatably and reciprocably received in a passage of a housing which communicates with a supply chamber, and in which a plunger is sealingly telescoped in the blind bore of the piston to define at the open end of the bore with the housing a first working chamber and to define between the closed end of the bore and the plunger a second working chamber. The piston is further formed with axially displaced ports which provide in first angular positions of the piston communication between the supply chamber and the working chambers and which provide in second angular positions communication between the working chambers and outlets formed in the housing.

---

The present invention relates to lubricating pumps in general, and more particularly to a lubricating pump which can furnish accurately metered quantities of lubricant to a single consuming station or to two or more such stations. Still more particularly, the invention relates to improvements in piston-type or plunger-type lubricating pumps wherein a rotary piston performs alternating suction and injection strokes.

Piston-type oil pumps are known in the art. Such pumps may be used to supply lubricant simultaneously to several consuming stations, for example, by connecting the outlet of the pump with a distributor which divides the lubricant into several streams or by providing the pump with several outlets. In the latter instance, the outlets are spaced from each other in the circumferential direction of the revolving piston, and the piston is provided with a groove which establishes a path between the source of lubricant and consecutive outlets during each revolution of the piston. Serious problems arise when the pump is to furnish lubricant to three or more consuming stations because the diameter of the piston must be large enough to insure that each outlet receives lubricant independently of the other outlets. Also, and if the piston is to furnish lubricant to three, four or more angularly spaced outlets, the construction of the mechanism which reciprocates the piston in its housing becomes so complicated that the pump is either too expensive or is unable to furnish accurately metered quantities of lubricant to each outlet.

Accordingly, it is an important object of the present invention to provide a very simple, compact, rugged and accurate pump which can supply metered (equal or different) quantities of lubricant to a large number of consuming stations and which is particularly suited for supplying relatively small quantities of lubricant.

Another object of the invention is to provide a lubricating pump of the just outlined characteristics which is constructed and assembled in such a way that its metering action remains unchanged for long periods of time, wherein the parts which determine the accuracy of the metering action are subjected to negligible wear, and which can be used in automotive vehicles, in machine tools as well as in many other machines or apparatus where several consuming units must receive accurately metered quantities of lubricant at frequent intervals and in a fully automatic way.

An additional object of the invention is to provide a lubricating pump whose metering action may be regulated with utmost precision and in a very simple way by resorting to simple instrumentalities and without necessitating an interruption in the operation of the pump.

Still another object of the invention is to provide a novel adjusting system for regulating the metering action of the improved pump and to provide a novel drive for the rotary piston whose strokes determine the quantity of lubricant which is being supplied to the consuming units.

Briefly stated, one feature of our present invention resides in the provision of a lubricating pump comprising a housing which defines a supply chamber for lubricant and is provided with a cylindrical passage, a rotary piston reciprocably received in the passage and having an axially extending blind bore, a first working chamber defined by the piston and housing in the region of the open end of the blind bore, a plunger sealingly telescoped into the blind bore and defining with the piston a second working chamber which is adjacent to the closed end of the blind bore, port means provided in the hollow sleeve-like portion of the piston for entry of lubricant from the supply chamber into the working chambers in first angular positions of the piston, outlet means provided in the housing and communicating with the port means in second angular positions of the piston, means for rotating the piston with reference to the housing, and means for reciprocating the piston with reference to the plunger so that the piston performs alternating suction and injection strokes to draw lubricant from the supply chamber into the working chambers in its first angular positions and to expel such lubricant from the working chambers through the outlet means in its second angular positions.

The novel features which are considered as characteristic of the invention are set forth in particular in the appended claims. The improved lubricating pump itself, however, both as to its construction and its mode of operation, together with additional features and advantages thereof, will be best understood upon perusal of the following detailed description of certain specific embodiments with reference to the accompanying drawings, in which:

FIG. 1 is an axial section through a lubricating pump which embodies one form of our invention;

FIG. 2 is a side elevational view of the pump as seen from the right-hand side of FIG. 1, with certain parts shown in section;

FIG. 3 is a top plan view of the pump, with certain parts shown in section;

FIG. 4 is a fragmentary partly front elevational and partly sectional view of a slightly modified lubricating pump; and FIG. 5 is an enlarged fragmentary partly sectional view of the means for reciprocating the piston with reference to the plunger.

Referring first to FIGS. 1 to 3, there is shown a lubricating pump which comprises a housing 1 defining a supply chamber 10 which is connected with a suitable source of lubricant by way of inlets 10a. The housing 1 is further provided with an elongated cylindrical passage 1' one end of which communicates with the supply chamber 10 and the other end of which is enlarged, as at 18, to accommodate a spherical sealing element 19. The passage 1' receives a rotary piston 2 which is reciprocable up and down, as viewed in FIG. 1, to respectively perform alternating suction and injection strokes. That end portion of the piston 2 which extends into the supply chamber 10 carries a disk-shaped cam 6 which forms part of means for rotating and for simultaneously reciprocating the piston through strokes of predetermined maximum length. The cam 6 is provided with an annulus of teeth 5 which mesh with a worm 4 secured to a driven worm shaft 3. Thus, the piston 2 will rotate in response to rotation of the worm shaft. The means for reciprocating the piston further comprises two lobes 7 which are provided on the upper end face of the cam 6, as viewed in FIG. 1 or 2, and cooperate with a fixed pin-shaped follower 8 which is secured to a detachable cover or lid 9 of the housing 1 and extends into the supply chamber 10. It will be noted that the follower 8 is eccentric with reference to the piston 2 and that the two lobes 7 are located diametrically opposite each other with reference to the common axis of the piston 2 and passage 1', see particularly FIG. 3. The means for reciprocating the piston 2 also comprises a helical expansion spring 26 whose mounting will be described later and which, assisted by the pressure of lubricant, biases the upper end face of the cam 6 against the follower 8. During each of its revolutions, the piston 2 performs two suction strokes and two injection strokes. The top faces of the lobes 7 are flat and are precision finished so as to be located in a common plane which is normal to the axis of the piston 2. Each of these lobes can cause the piston to perform a stroke of identical length.

The cover 9 supports an adjustable cylindrical pin-shaped stop 11 which is reciprocable in its bore and may be adjusted axially by a cam face 14 provided on the periphery of an adjusting spindle 13 mounted in a bore 12 of the cover 9. The axis of the bore 12 is normal to the axis of the passage 1' and the stop 11 is coaxial with the piston 2 and cam 6. A retaining screw 15 is threaded into the cover 9 and its tip extends into a peripheral cutout 16 of the spindle 13 to hold the latter against axial movement. The outer end portion 17 of the spindle is slotted so that it may be engaged by a screwdriver or by another suitable tool when the operator desires to change the angular position of the spindle and to thus adjust the axial position of the stop 11. This stop cooperates with the lobes 7 to determine the maximum length of strokes performed by the piston 2.

The passage 1' further accommodates a plunger 21 whose lower end portion or foot 20 bears against the sealing element 19, i.e., the element 19 constitutes an abutment for the plunger 21. This plunger is sealingly telescoped into an axially extending blind bore 22 of the piston 2 and comprises two neck portions 23, 24 as well as a boss 21' which is integral with the foot 20. As shown in FIG. 1, the piston 2 and the plunger 21 define between themselves a working chamber 28 which forms part of the blind bore 22 and is adjacent to the closed end of this bore. Another working chamber 27 is provided in the region of the open end of the bore 22, and this working chamber extends from the foot 20 to the upper end of the neck portion 24 so that it occupies parts of the passage 1' and of the bore 22. The spring 26 is accommodated in the working chamber 27 and one of its end convolutions bears against the foot 20. The other end convolution bears against the annular end face 25 of the piston 2, i.e., against that end face which surrounds the open end of the blind bore 22. Due to such mounting, the spring 26 maintains the foot 20 in abutment with the sealing element 19 and also biases the piston 2 upwardly so that the cam 6 invariably bears against the follower 8 or against the stop 11. The plunger 21 does not reciprocate but is preferably rotatable with the piston 2 to reduce wear. The wear on the foot 20 is negligible because the latter is in mere point contact with the spherical sealing element 19. The area of the end face 25 on the piston 2 preferably equals or at least approximates the area of the effective surface on the plunger 21, i.e., the combined area of the end face on the neck portion 23 and of the annular shoulder at the lower axial end of the neck portion 23. This neck portion 23 is provided for the purpose of reducing the volume of the working chamber 28.

The housing 1 is formed with a total of four outlets 29, 30, 31 and 32. The outlets 29 and 30 may communicate with the working chamber 27 and the outlets 31, 32 may communicate with the working chamber 28. The sleeve-like portion of the piston 2 which is provided with the blind bore 22 has two radial ports 33 and 34 which can admit lubricant into the working chambers 27, 28 or allow the thus admitted lubricant to enter the outlets 29, 30 and 31, 32, respectively. FIG. 2 shows that the housing 1 is formed with two channels 39, 40 which are in communication with the supply chamber 10 and extend in parallelism with the passage 1'. These channels respectively communicate with radial ducts 35, 37 and 36, 38 whereby the ducts 35, 36 can communicate with the port 33 and the ducts 37, 38 can communicate with the port 34, depending on the angular position of the piston 2.

The operation of the heretofore described lubricating pump is as follows:

When the worm shaft 3 is driven, the worm 4 rotates the cam 6 and the piston 2. While the follower 8 slides along one of the lobes 7, i.e., while the piston 2 performs a suction stroke and moves axially in a direction toward the stop 11, it follows the bias of the spring 26 and the volume of the working chambers 27, 28 increases. During such suction stroke, the ports 33, 34 communicate with the ducts 35, 37 or 36, 38 and allow lubricant to enter the chambers 27, 28 via channel 39 or 40. The suction stroke is completed when the central portion of the cam 6 abuts against the stop 11. The piston 2 will perform a suction stroke of maximum length if the cam 6 remains in continuous contact with the follower 8; otherwise, the piston 2 will draw less than the maximum amount of lubricant into the two working chambers. In other words, if the cam 6 moves shortly away from actual contact with the follower 8, the piston 2 will perform a suction stroke of less than maximum length. The axial position of the stop 11 determines the maximum length of the suction stroke and the follower 8 determines the length of the injection stroke. By adjusting the axial position of the stop 11, the operator can change, to the same degree, the amounts of lubricant which is expelled from the working chambers 27, 28 during each injection stroke of the piston 2.

In order to perform an injection stroke, the piston 2 compresses the spring 26 because the follower 8 is then in contact with a rising portion of one of the cam lobes 7 whereby the volume of the working chambers 27, 28 decreases at the same rate and the lubricant is expelled through the outlets 29, 31 or 30, 32.

In order to complete a suction stroke and an injection stroke, the piston 2 must rotate through 180 degrees. During the next half revolution, the piston 2 again performs a suction stroke and an injection stroke so that, while completing a full revolution, the piston causes lubricant to enter once the outlets 30, 32 and once the outlets 29, 31. During each of its revolutions, the piston 2 assumes two angular positions in which the supply chamber 10 communicates with the working chambers 27, 28 (once via channel 39 and ducts 35, 37 and once via channel 40 and ducts 36, 38) and two angular positions in one of which the working chambers 27, 28 communicate with the outlets 29, 31 and in the other of which the working chambers communicate with the outlets 30, 32. Thus, the consuming units or stations which are connected with the outlets 29–32 receive lubricant at regular intervals and in accurately metered quantities.

If the pump is to furnish lubricant to three consuming units, one can resort to a structure which is illustrated in FIG. 4. The modified pump of FIG. 4 has three outlets whereby the outlet 32 may be omitted or is sealed off. In drilling the outlet 31, the bore is extended to the other side of the passage 1' and is connected with the supply chamber 10 by a return channel 41. During each revolution of the piston 2, the channel 41 admits lubricant from the working chamber 28 to the supply chamber 10 when it registers with the port 34 and when the piston 2 performs an injection stroke. In other words, that quantity of lubricant which would have been expelled through the outlet 32 of FIG. 1 is returned to the supply chamber 10 and it can be said that the channel 41 constitutes a fourth outlet which discharges back into the supply chamber. It is clear that the number of useful outlets can be reduced still further, for example, by replacing the outlet 30 of FIG. 1 with a second return channel analogous to the channel 41 and discharging into the supply chamber 10. It is equally clear that the pump of our invention may be modified by omitting one of the lobes 7 so that the piston 2 performs only one suction stroke and only one injection stroke during each of its revolutions. Such modified pumps may be used for supplying lubricant to a single consumer or to two consumers. If the piston 2 performs only one suction stroke and only one injection stroke during each of its revolutions, the length of intervals during which the ports 33, 34 communicate with the supply chamber 10 or with the corresponding outlets will be longer.

It was found that the accuracy of a pump which is constructed to supply relatively small quantities of lubricant to one or more consuming units depends to a considerable degree on the wear of its parts. Thus, even a very small change in the length of suction and/or injection strokes can bring about considerable changes in the amount of injected lubricant. Such highly undesirable variations in the rate of lubricant flow to the consuming units are observable as the wear on the moving parts of the pump progresses. In order to reduce such wear, the pump of our invention is preferably constructed in such a way that the length of strokes performed by the piston 2 should change very little or not at all. As shown in FIG. 5, the follower 8 is preferably formed with a plano end face 8' which is normal to the axis of the follower and which constitutes the top face of a frustoconical tip 8". The conicity or taper of the tip 8" exceeds only slightly the inclination of the surface on the lobe or lobes 7 so that the follower is substantially in face-to-face contact with the lobes and is subjected to negligible wear, i.e., to a wear which is much less than if the parts 7 and 8 were in a mere point contact with each other. The top face 8' in particular is subjected to little or no wear at all and, since this top face determines the length of the injection stroke of the piston 2, such injection stroke does not change even after extended use of the pump.

The pump of our present invention is particularly suited for delivery of relatively small quantities of lubricant to one, two, three, four or more consuming units or stations. Such quantities can be much smaller than in heretofore known piston pumps and highly accurate metering of lubricant can be achieved by utilizing a piston of very small diameter. By the simple expedient of providing the piston 2 with a blind bore 22 and by combining this piston with a plunger 21 which defines therewith a second working chamber 28, the improved pump can expel accurately metered quantities of lubricant to a large number of consumers without necessitating a large-diameter piston and without unduly complicating the mechanism which controls rotation, reciprocation and the length of strokes of the piston 2.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A lubricating pump, comprising a housing defining a supply chamber and having a passage therein; a rotary piston reciprocably received in said passage and having a blind bore and defining with said housing a first working chamber at the open end of said bore; a plunger sealingly telescoped into said bore and defining with said piston a second working chamber at the closed end of said bore, said piston further having port means for entry of lubricant from said supply chamber into said working chambers in first angular positions of the piston and said housing further having at least two outlet means respectively communicating through said port means with said working chambers in second angular positions of said piston; and means for rotating said piston in one direction with reference to said housing and for reciprocating the piston with reference to said plunger so that the piston performs alternating suction and injection strokes to draw lubricant from said supply chamber into said working chambers in said first angular positions and to expel lubricant from said working chambers through said outlet means in said second angular positions thereof.

2. A lubricating pump as set forth in claim 1, wherein said plunger comprises an end portion which abuts against abutment means provided in said housing and wherein said reciprocating means comprises a spring which biases said end portion against said abutment means, such bias of the spring being assisted by the pressure of lubricant in said first working chamber.

3. A lubricating pump as set forth in claim 1, further comprising a single adjustable stop means for regulating the length of said suction strokes for regulating the amount of lubricant fed into said first and said second working chambers during said suction stroke and therewith the amount of lubricant discharged from said working chambers during said injection stroke.

4. A lubricating pump as set forth in claim 1, wherein said piston comprises a sleeve-like portion which surrounds said blind bore, wherein said ports are provided in said sleeve-like portion axially displaced from each other, and wherein said plunger has an enlarged diameter portion located between said axially displaced ports and sealingly engaging the inner surface of said sleeve-like portion and at least one reduced diameter portion projecting from said enlarged diameter portion in direction away from said closed end of said bore.

5. A lubricating pump as set forth in claim 1, wherein said piston and said plunger have effective surfaces of identical areas.

6. A lubricating pump as set forth in claim 1, wherein said housing is further provided with a return channel communicating with said supply chamber, one of said ports being in communication with said channel during part of each revolution of said piston and while the piston performs an injection stroke so that lubricant can return from the respective working chamber to said supply chamber.

7. A lubricating pump as set forth in claim 1, wherein said reciprocating means comprises a cam fixed to said piston and having an end face provided with a lobe, and a follower fixed to said housing and arranged to track said end face.

8. A lubricating pump as set forth in claim 7, wherein said follower comprises a frustoconical tip having a plano end face and wherein the taper of said tip exceeds only slightly the inclination of the surface on said lobe.

9. A lubricating pump as set forth in claim 7, wherein said passage communicates with said supply chamber and wherein said cam and said follower are accommodated in said supply chamber.

References Cited
UNITED STATES PATENTS

| | | | |
|---|---|---|---|
| 1,617,199 | 2/1927 | Coles | 103—157 |
| 2,746,443 | 5/1956 | Meyer | 103—2 |
| 2,808,779 | 10/1957 | Mueller | 103—2 |
| 2,969,738 | 1/1961 | Ulbing | 103—2 |

FOREIGN PATENTS

| | | |
|---|---|---|
| 718,314 | 11/1954 | Great Britain. |
| 903,402 | 8/1962 | Great Britain. |

HENRY F. RADUAZO, *Primary Examiner.*